(12) United States Patent
Crump

(10) Patent No.: US 6,585,329 B2
(45) Date of Patent: Jul. 1, 2003

(54) RIMGUARD

(76) Inventor: Corey Angelo Crump, 4810 Mountcastle Rd., Providence Forge, VA (US) 23140

( * ) Notice: Subject to any disclaimer, the term of this patent is extended or adjusted under 35 U.S.C. 154(b) by 0 days.

(21) Appl. No.: 09/996,504

(22) Filed: Nov. 28, 2001

(65) Prior Publication Data

US 2003/0098607 A1 May 29, 2003

(51) Int. Cl.$^7$ ................................................ B60B 7/00
(52) U.S. Cl. ......................... 301/37.103; 301/37.101; 301/37.32
(58) Field of Search ................. 301/37.103, 37.104, 301/37.105, 37.42, 37.101, 37.33, 37.31, 37.35, 37.36, 37.32, 37.34

(56) References Cited

U.S. PATENT DOCUMENTS

| | | | |
|---|---|---|---|
| 3,724,906 A | * | 4/1973 | McCarroll ............... 301/37.31 |
| 4,784,440 A | | 11/1988 | Fair |
| 4,792,191 A | | 12/1988 | Farmer |
| 4,811,991 A | * | 3/1989 | Moreno et al. ........ 301/37.103 |
| 4,874,206 A | | 10/1989 | Sampson |
| 5,423,599 A | | 6/1995 | Sherod et al. |
| 5,435,630 A | | 7/1995 | Tucker |
| 5,524,972 A | | 6/1996 | Cailor et al. |
| 5,752,745 A | * | 5/1998 | Sheu ....................... 301/37.32 |
| 5,897,172 A | * | 4/1999 | Jarrell ..................... 301/108.1 |
| 6,068,345 A | | 5/2000 | Bressie |
| 6,227,623 B1 | | 5/2001 | Bellow |

* cited by examiner

Primary Examiner—S. Joseph Morano
Assistant Examiner—Frantz F. Jules

(57) ABSTRACT

The rim guard is a hollow, thin plastic generally bowl-shaped body, having a large diameter open end and a handgrip that is centrally located along with thumb rest on the incline at the small diameter closed end. The rim guard can be made in different sizes to fit accurately over all rims with two locking clamp-like mechanisms located on the periphery right and left side. When the rim guard is secured over the outer flange portion of the wheel, it will rigidly abut the sidewall of the tire with the two clamps closed and locked in place into the crevice formed between the rim portion of the wheel and the inner sidewall of the tire. The rim guard is thereby held detachably on the wheel to prevent detailing solution from draining downward onto the wheel.

4 Claims, 5 Drawing Sheets

RIMGUARD

CROSS REFERENCES TO RELATED APPLICATIONS

| 4784440 | November 1988 | Fair | 301/37. |
|---------|---------------|------|---------|
| 4792191 | December 1988 | Farmer | 301/37. |
| 4874206 | October 1989 | Sampson | 301/37 |
| 5423599 | June 1995 | Sherod et al. | 301/37 |
| 5435630 | July 1995 | Tucker | 301/37 |
| 5524972 | June 1996 | Cailor et al. | 301/37 |
| 6068345 | May 2000 | Bressie | 301/37 |
| 6227623 | May 2001 | Bellow | 301/37 |

STATEMENT OF FEDERALLY SPONSORED RESEARCH/DEVELOPMENT

"Not Applicable"

REFERENCE TO A MICROFICHE APPENDIX

"Not Applicable"

BACKGROUND OF THE INVENTION

The need for detailing of vehicle rims has become more progressive in recent years. Detailing tires is accomplished by applying a spray solution or similar solution to the sidewall of a tire. By applying solution, it will prevent tires from cracking or fading and will also increase the overall appearance of the tire.

The problem associated with spraying detailing solution on the sidewall of the tire is the spray is usually accidentally applied on the rim or drips down onto rim which causes unsightly dulling or smearing. In most cases, when the detailing solution is applied it splashes onto the rim and one has to quickly wipe the detailing solution from the rim by using a cloth or it will detract from the appearance by losing it's luster and shine. In other cases, one would have to polish the rim over once again.

BRIEF SUMMARY OF THE INVENTION

The present invention is a protective wheel shield made of an inexpensive, plastic that is shaped to fit accurately over the outer peripheral edge of a specified wheel size on a automobile wheel rim. For example, the protective shield will be manufactured to specifically accommodate each individual size automobile wheel, from 13", 14", 15" and various sizes up to tractor trailer wheel rim sizes.

The protective shield which comprises a generally triangular bowl-shaped body having a large diameter open end. Also, having a centrally raised closed diameter end which consists of a thumb rest and handgrip for insertion of user's fingers along the incline for means of placing the body over the wheel of an automobile.

After hand grasping the rim guard and placing over the wheel rim, the two arm-like clamp structures centrally located on the peripheral right and left edge of the hollow frusto conical body will be manually closed down allowing the inwardly portion of the clamp to be wedged in the crevice formed between the inner surface of the outer flange portion of the rim and the inner sidewall of the tire. Once the protective shield is in place over the wheel rim and the two clamp structures are closed down, the shield will remain freely on the wheel rim abutting the sidewall of the tire.

Accordingly, my invention will be manufactured of durable, lightweight plastic. After one's use, the protective shield can be cleaned and stored for future use.

These and other objects and features of the present invention will become more apparent and appreciated from the following detailed description when accompanied by the illustrated drawings.

BRIEF DESCRIPTION OF THE SEVERAL VIEWS OF THE DRAWINGS

FIG. 1A is an enlarged right side view of the arm-like clamp structure;

FIG. 2A is an enlarged left side view of the arm-like clamp structure;

FIG. 4A is an enlarged rear view of the arm-like clamp structure;

DETAILED DESCRIPTION OF THE INVENTION

Figure 1:
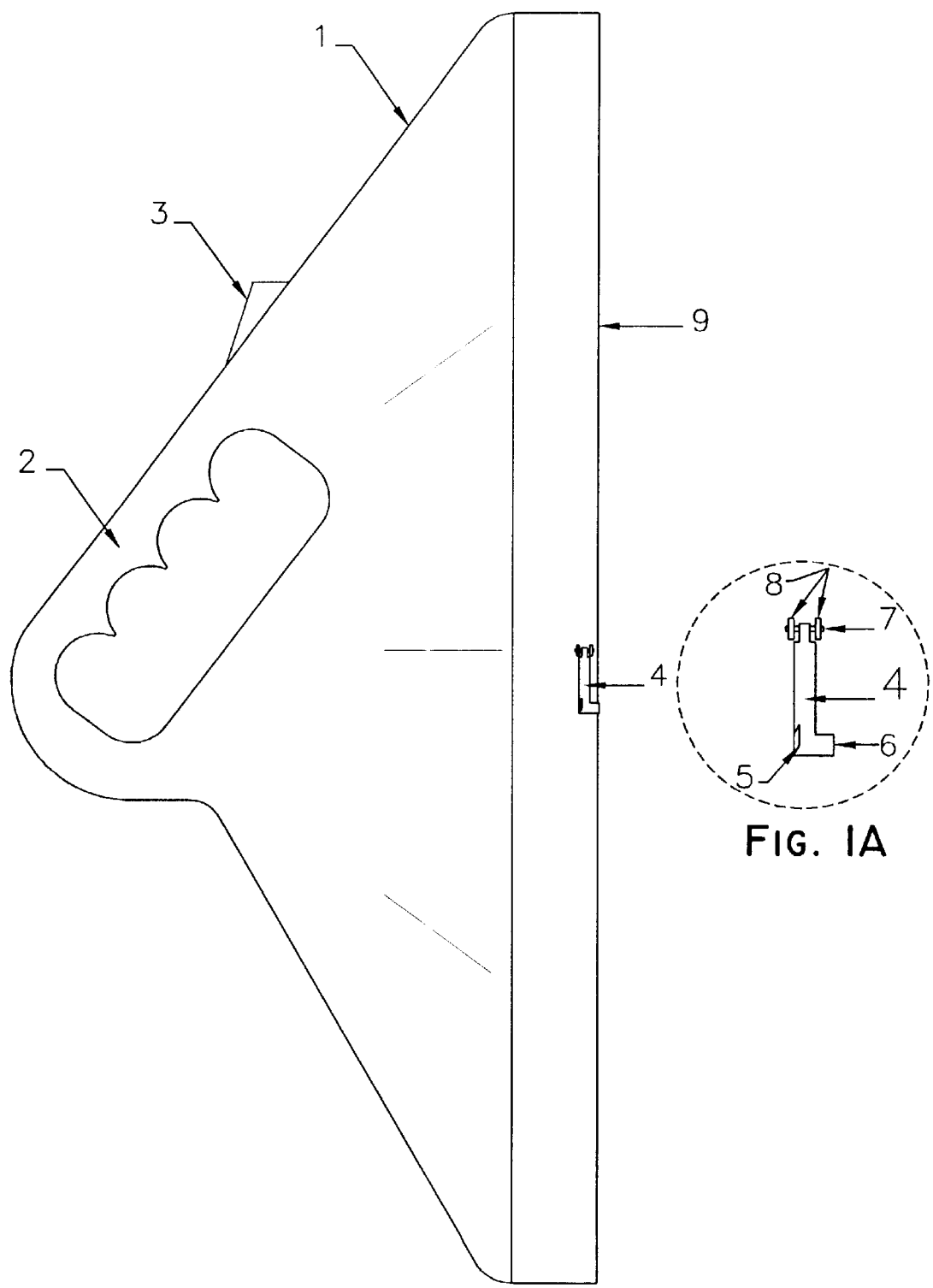
FIG. 1 is the right perspective view illustrating the protective wheel shield according to the present invention.

In FIG. 1, a right side view of the protective wheel shield is shown. A generally hollow, frusto-conical body 1 fabricated of a hard plastic substance with a large diameter open end 9 and a triangular bowl-shaped small diameter closed end featuring a handgrip 2 will be made for insertion of one's fingers to manually grasp the hollow body 1 with a thumb rest 3 centrally positioned in the middle of the incline for steady positioning over the outer flange portion of the wheel.

Figure 5:
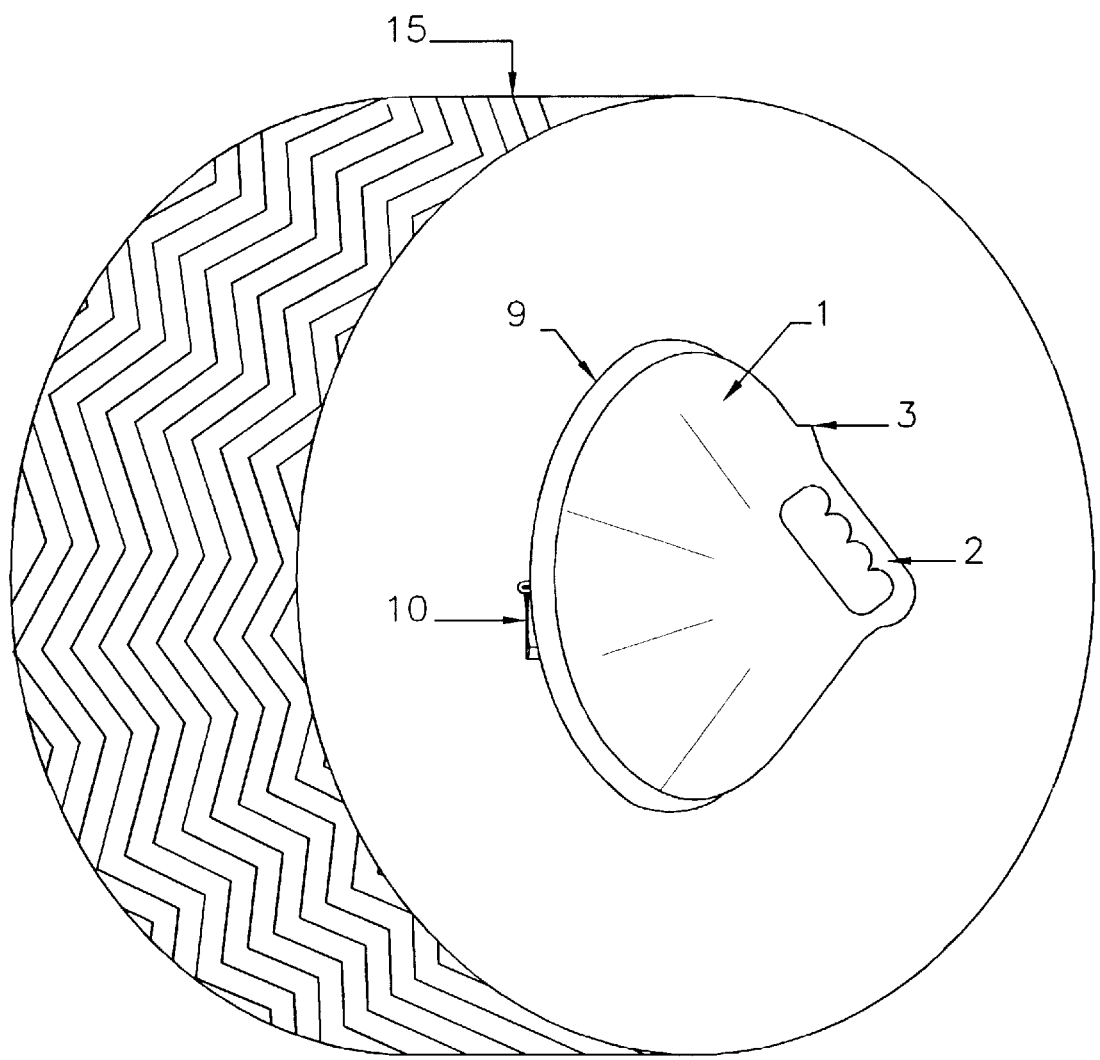
FIG. 5 is a perspective view of an automobile wheel illustrating the protective shield of the present invention attached to the outer flange portion of the wheel.

As shown in FIG. 5, it is also important that the clamp-like structure 10, is manually closed once the protective shield 1 is placed over the outer flange rim portion of the wheel, not illustrated in FIG. 5. In doing so, this will tightly secure the protective shield 1 onto the circumferential edge portion of the wheel allowing the open end 9 of the protective shield 1 which extends outwardly to abut the sidewall of the tire 15 preventing any spray solution from getting on wheel rim of an automobile.

In the process of manually closing the clamp-like structures 4 and 10, there are two components at the base of each clamp-like structure 4 and 10, which bevels inwardly 6 and 11 and another that bevels outwardly 5 and 12. Generally, the inwardly portion 6 and 11 of each clamp-like structure 4 and 10 when manually closed down will wedge in the crevice formed between the inner sidewall of the tire and the inner surface of the outer flange portion of the rim wheel. Consequently, at the base of each clamp-like structure 4 and 10, the portion that bevels outwardly 5 and 12 is manually gripped with one's free hand to open and close the clamp-like structures 4 and 10 locking the protective shield 1 onto the wheel rim of an automobile as shown in FIG.5.

Figure 3A:
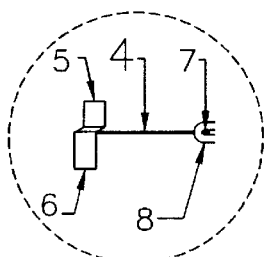
FIG. 3A is an enlarged front view of the arm-like clamp structure.
Figure 3:
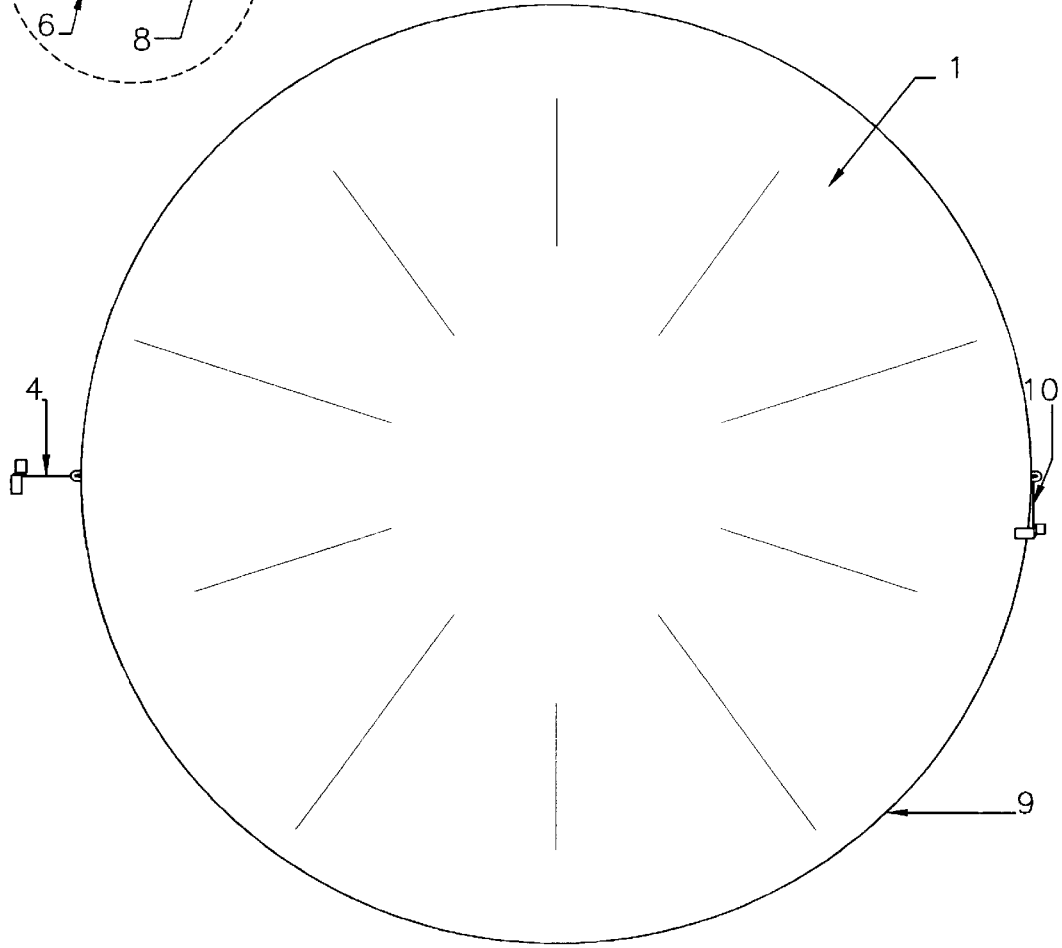
FIG. 3 is a front view of the protective wheel shield.

Referring back to FIGS. 1A, and 3A, shows an enlarged right side view of the clamp-like structure 4. Peg mounts 8 are permanently installed during manufacturing onto protective shield 1 allowing a peg 7 to be inserted through an opening in the top of clamp like structure 4 and through openings in peg mounts 8. This will aid in the motility and allow the clamp-like structure 4 to be manually opened and closed.

Referring back to FIGS. 2A and 4A, shows an enlarged left side view of the clamp-like structure 10. Peg mounts 14 are permanently installed during manufacturing onto protective shield 1 allowing a peg 13 to be inserted through an opening in the top of clamp like structure 10 and through openings in peg mounts 14. This will aid in the motility and allow the clamp-like structure 10 to be manually opened and closed.

Figure 2:
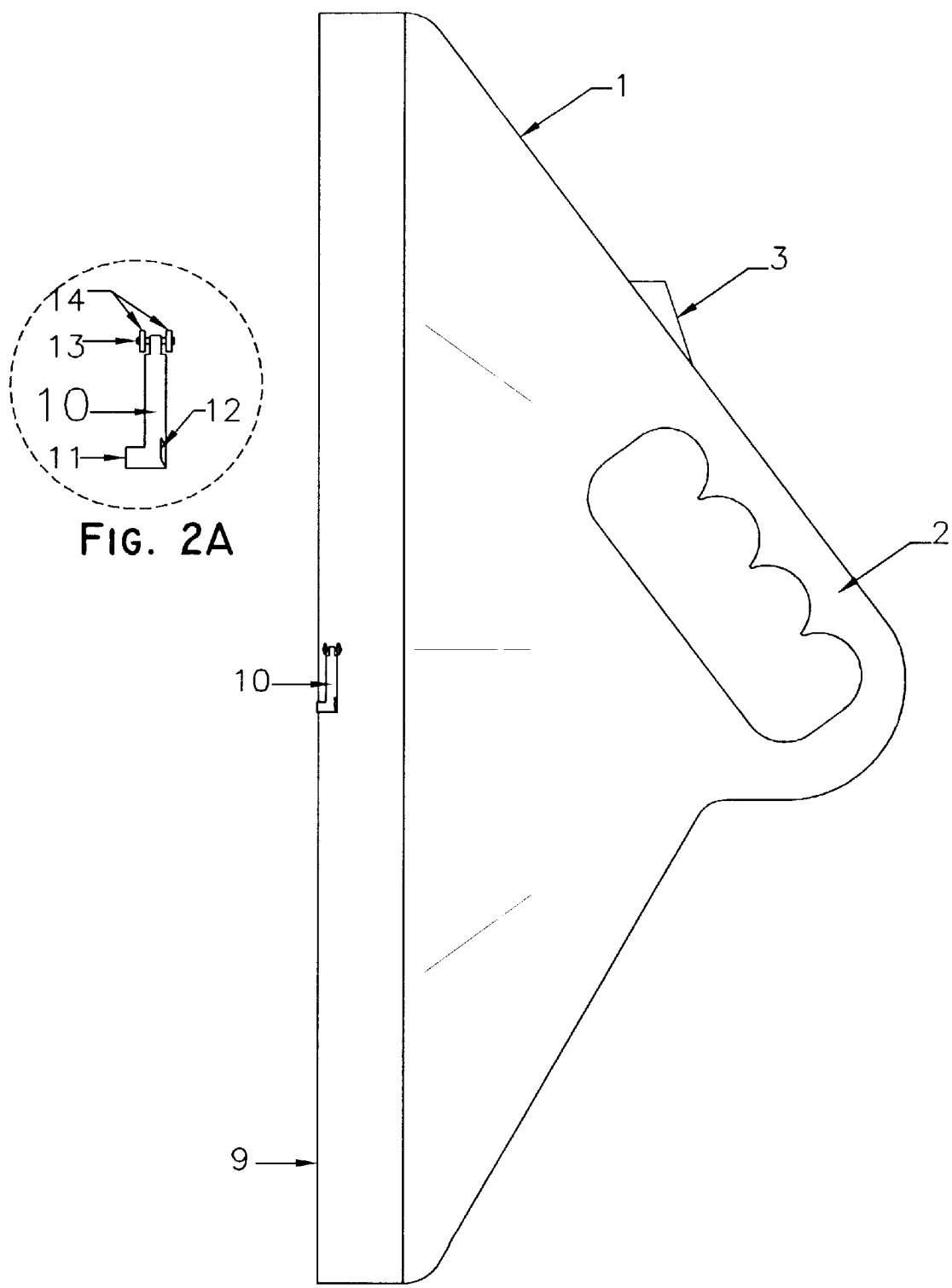
FIG. 2 is the left perspective view illustrating the protective wheel shield according to the present invention.

As shown in FIG. 2, the generally triangular bowl-shaped body 1 will have a thumb rest 3 centrally positioned down the incline with a handgrip 2 below the thumb rest 3 for insertion of one's fingers for a firm and steady grip while placing the protective shield 1 onto the wheel rim of an automobile. The large diameter open end 9 extends outwardly to overlie the entire outer flange portion of the wheel rim abutting the sidewall of the tire forming a shield over the entire wheel and preventing any spray solution or cleaner from getting onto wheel rim.

Figure 4:
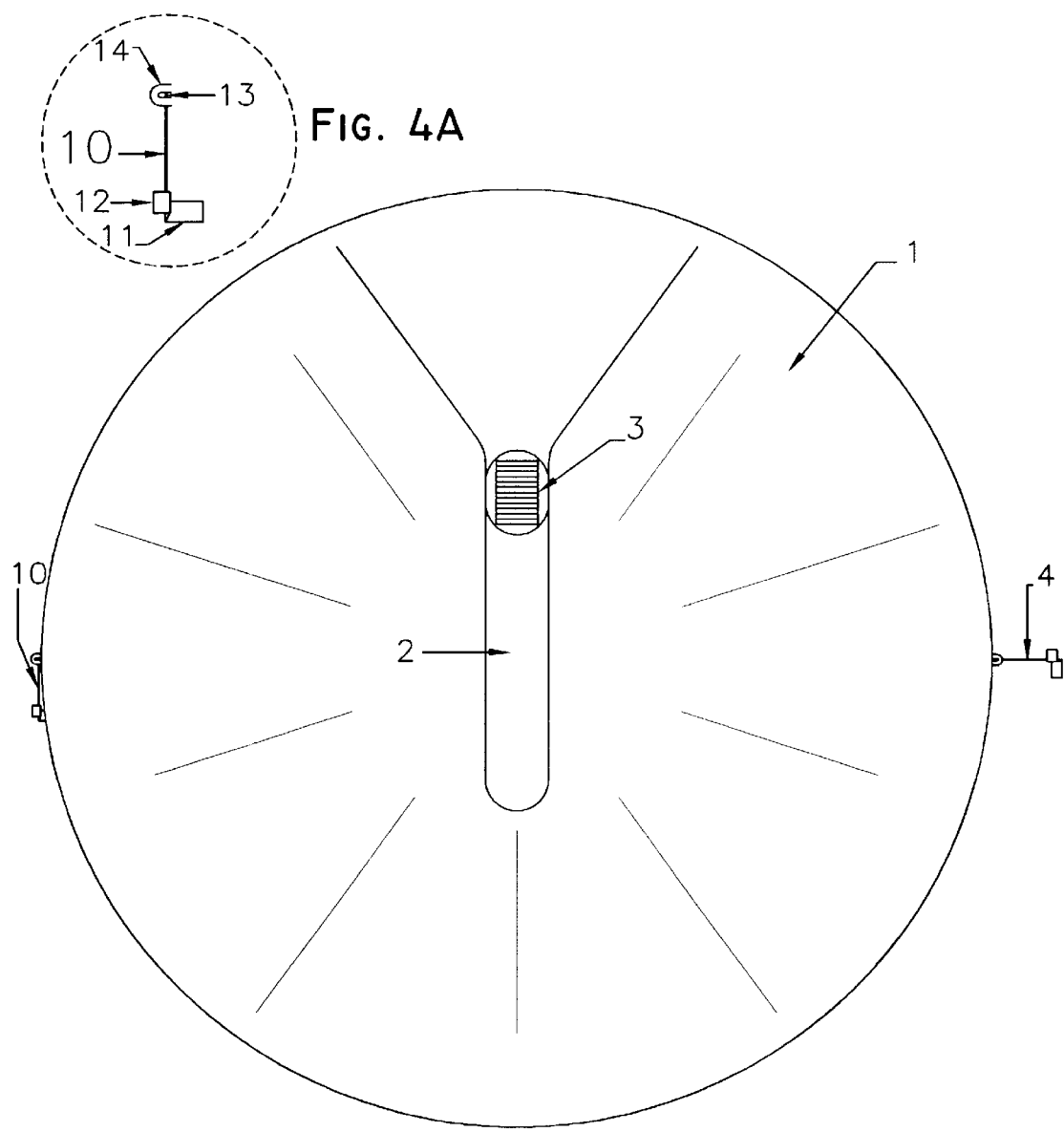
FIG. 4 is the rear view of the protective wheel shield.

As shown in FIG. 2, to place the present invention in an operative position, one would grasp the handgrip 2 inserting fingers, and placing thumb onto thumb rest 3 for steady positioning while manually placing the protective shield 1 onto an automobile wheel rim. With one hand the protective shield 1 is manually held over the wheel rim while one would use free hand to manually close down the outwardly portion 12 located on the left side of the clamp-like structure 10 placing into a locked position allowing the inwardly portion 11 of the clamp-like structure 10 to wedge in the crevice formed between the inner surface of the outer flange portion of the of the rim and the inner sidewall of the tire. As shown in FIG.4, the clamp-like structure 4 is in an open position, one would then grasp the outwardly portion 5 and manually close down placing the clamp-like structure 4 into a locked position, allowing the inwardly portion 6 to wedge in the crevice formed between the inner surface of the outer flange portion of the rim and the inner sidewall of the tire allowing the protective shield 1 to remain freely onto the wheel rim of an automobile. In FIG. 5, the protective shield 1 is shown in an operative position, one would then spray or sponge on detailing or cleaning solution to the sidewall of a tire, thus preventing any solution from leaking onto wheel rim of an automobile.

Upon completion of detailing automobile tire 15, the protective shield 1 can be detached from wheel rim by simply grasping the handgrip 2, with free hand one would grasp the outwardly portion 5 located on the right side and manually open the clamp-like structure 4, disengaging the inwardly portion 6 from the crevice formed between the inner surface of the outer flange portion of the rim and the inner sidewall of the tire. Subsequently, one would then grasp the outwardly portion 12 located on the left side and manually open the clamp-like structure 10, disengaging the inwardly portion 11 from the crevice formed between the inner surface of the outer flange portion of the rim and the inner sidewall of the tire unlocking the protective shield 1 from the automobile wheel rim. The protective shield 1 can be cleaned and stored for future use.

Let it be understood, this specific design which has been described in detail throughout, may possibly have modifications made by those skilled in the art without taking from the spirit and scope of the invention.

What is claimed is:

1. A protective shield for covering an automobile wheel rim, said shield comprising:

a generally triangular hollow bowl-shaped body having a thumb rest and a handgrip positioned adjacent each other and centrally on the bowl-shaped body, wherein the handgrip is comprised of finger holes for grasping the bowl-shaped body;

two elongated arm-like clamp structures located on opposite sides of said bowl-shaped body, the two structures attached to the bowl-shaped body by peg mounts, wherein the peg mounts are located on an outside circumferential edge midway down each side of the bowl-shaped body;

wherein peg mounts are installed during manufacturing, by the way of the pegs inserted through the peg mounts and through a portion of each clamp structure.

2. The protective shield according to claim 1, said bowl-shaped body having a large diameter open end, and said handgrip with thumb rest located at a centrally raised closed diameter end of said bowl-shaped body.

3. The protective shield according to claim 1, wherein said pegs are generally inserted horizontally through said peg mounts and through an uppermost portion of said arm-like clamp structures which are installed during manufacturing and are located on the right and left side of the circumferential edge portion of said hollow body.

4. A detachable shield for protecting a wheel to be used when detailing or painting the sidewall of a tire, the shield comprising:

a hollow frusco-conical body molded of plastic having an incline on a centrally-raised closed diameter end that includes a thumb rest and a handgrip for insertion of user's fingers; and arm like clamps on both periphery sides midway down of a large open diameter end of said hollow frustro-conical body, the clamps adapted to releasably secure the shield over a tire rim.

* * * * *